Nov. 2, 1937. A. MADLÉ 2,097,633
TRANSMISSION MECHANISM
Original Filed Nov. 3, 1933 2 Sheets-Sheet 1

INVENTOR,
Alain Madlé
BY
ATTORNEY.

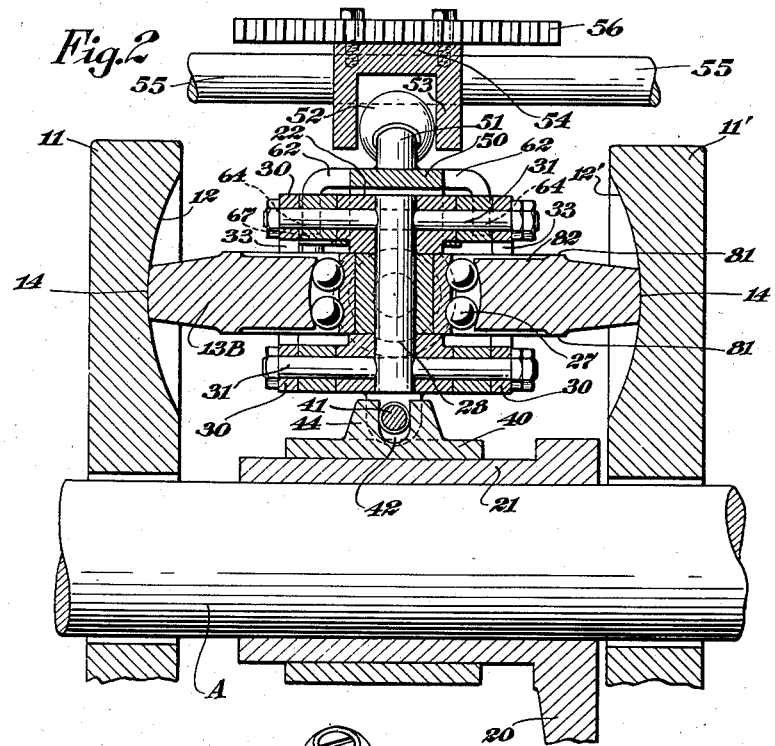
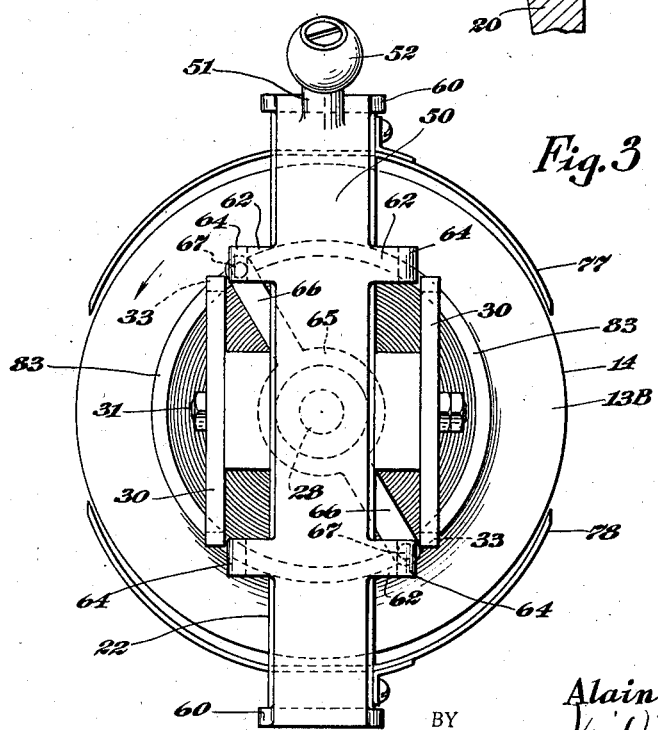

Patented Nov. 2, 1937

2,097,633

UNITED STATES PATENT OFFICE 2,097,633

TRANSMISSION MECHANISM

Alain Madlé, Bristol, Conn., assignor to Erban Operating Corporation, New York, N. Y., a corporation of New York Original application November 3, 1933, Serial No. 696,455. Divided and this application March 13, 1936, Serial No. 68,684

11 Claims. (Cl. 74—200)

My present invention relates generally to a system transmitting power by adhesive contact, and more particularly to such a system wherein the adhesive contact is along toric surfaces.

The system herein illustrated is provided with races having toric surfaces in opposed relation and rollers in adhesive contact with such toric surfaces, the rollers being shiftable across the toric surfaces for effecting changes in the ratio of transmission.

One of the important objects of my invention is the provision of an arrangement in such a system whereby the shifting of the rollers is effected automatically by the relative rotation of the parts, and wherein the control of the system is an indirect one requiring a minimum of effort for its operation.

Another object of my invention is the provision in a system employing a master and follow roller control of similar journalling means for all the rollers, whereby the master roller effect may be attained through any of the follow rollers by associating control with such roller to make it operate as a master roller. In other words, the present invention contemplates one design of roller mounting for all of the rollers and the adaptation of any one of these rollers as a master roller merely having the control elements control that roller.

My invention further provides a form of external roller control for a transmission in which the spider which carries the rollers is neither rigidly connected to the transmission housing nor completely rotatable around the axis of the transmission, but in which the spider is mounted for limited yielding movements.

My invention further contemplates an arrangement in which the operation of the roller control is effected by external means without interference by the yielding movement of the spider and eo converso, in which the movement of the spider is in no way restricted by the roller control means.

Among the further objects of my invention is the provision of the roller mounting in the roller carrier and of the mounting of the control elements in which elements serve a dual function, one in connection with the roller control means, and another in connection with the roller mounting means. In this manner I provide an arrangement which is simple in construction, more reliable in service because of the use of comparatively few parts and therefore less expensive to make.

The general object of this invention is the provision of a new and simplified transmission of the character referred to wherein the roller control and operation for ratio change purposes is simplified and made more efficient.

This application is a division of application Serial No. 696,455 filed November 3, 1933.

For the attainment of these objects and such other objects as may hereinafter appear or be pointed out, I have illustrated in the drawings embodiments of my invention wherein:

Fig. 2 is a section taken on line 2—2 of Fig. 1 looking in the direction of the arrows; and Fig. 3 is a view of a detail.

Figure 1:
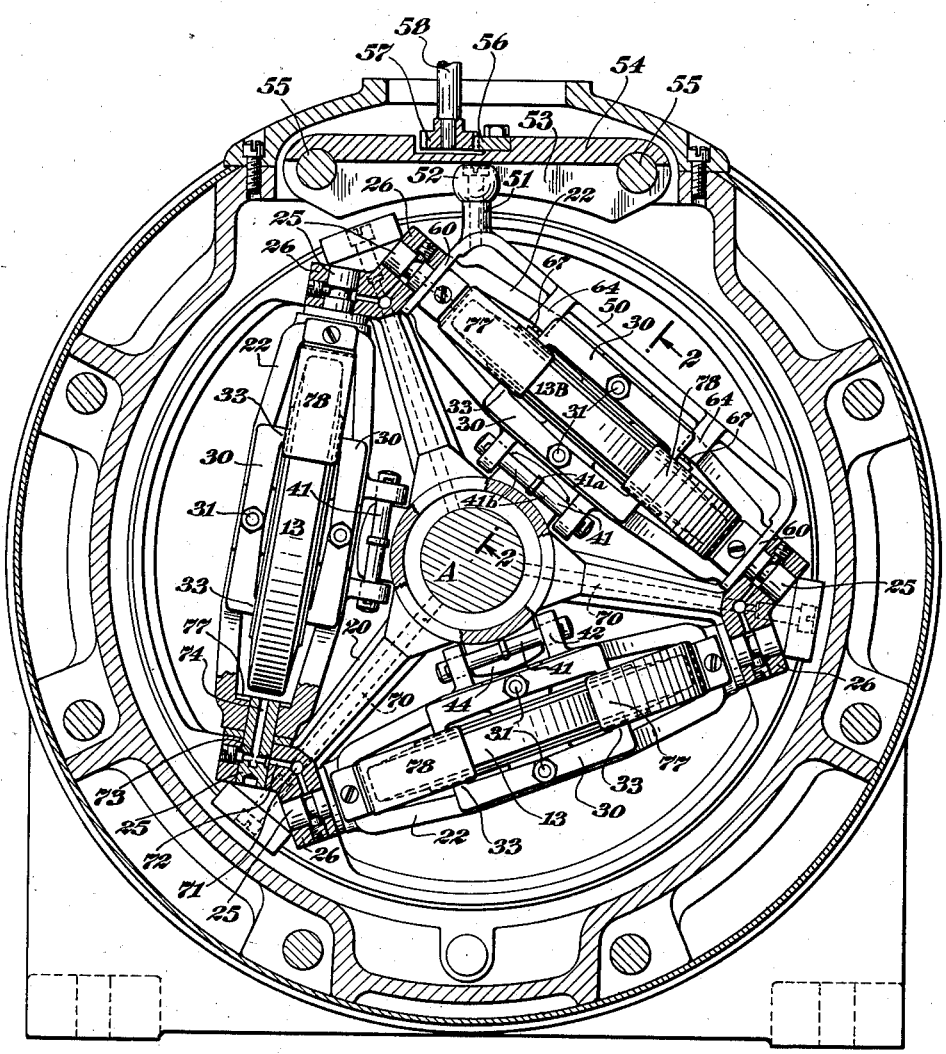
Fig. 1 is a vertical section through the roller system.

Before proceeding to describe my improvements, I will premise that in the embodiment illustrated in the drawings, my invention is shown applied to a transmission system comprising races 11 and 11' each provided with a toric face 12 or 12', (hereinafter referred to as races), positioned in symmetrically opposed relation, and rolling bodies shown as in the form of rollers 13 received between them, and each provided with an annular surface of contact 14.

It will be understood, of course, that either race 11 or 11' can be the driven race and the other the driving race, in which arrangements therefore the rollers serve to transmit the torque from one race to the other.

For convenience of description, I will term part of the mechanism which is in immediate association with the roller for causing a movement of the roller to change the ratio of transmission the "internal control means" and such other part of the mechanism which serves to operate this internal control means from the outside of the transmission or to transmit such operating movement from an externally operated element, which might be located either on the outside or even within the transmission housing, "external control means".

I have herein illustrated an arrangement whereby the ratio of transmission is varied by a tilting of the rollers and before describing the details of this arrangement, I will premise that (1) the variation is attained by change of leverage between the elements of the system; (2) the change in leverage is attained by the tilting of the rollers; and (3) the tilting of the rollers is attained by an angling of the rollers about an axis through their points of adhesive contact with the races and the action of the races upon the rollers as long as they remain angled is to cause the rollers to roll automatically to successively new positions of tilt until the desired change in tilt has been reached.

For this purpose, the rolling bodies take the forms of rollers 13, the contacting surfaces of which are generated specifically to permit these rollers to maintain a proper adhesive contact with the toric surfaces of the races as they are tilted and are, therefore, of a transverse radius not in excess of, and preferably smaller than, the transverse curvature of the toric faces 12 and 12', and the center of the rollers are shown as in the locus or path of a circle that generates these toric surfaces.

The rollers 13 are supported in the carriage 20 which take the form of a spider and the rollers form with this spider or carriage, a unitary assembly, which will hereinafter be referred to as the roller system. The spider or carriage 20 bears about the shaft A by means of the sleeve 21. The spider may be held stationary by any suitable connection with the housing of the transmission (not shown in the drawings).

The rollers are each supported in this system for a tilting movement about an axis diametrically through the rollers and at right angles to the diameter through the points of adhesive contact and also for an angling movement about an axis which is angularly related to the said diameter through the contact points.

Before describing the arrangement for attaining this tilting movement, I will premise that the rollers and the angling mechanism associated with each roller are substantial duplicates of each other, and can therefore be in the form of a standardized unit. The description of one of the rollers and its associated mechanism for giving it an angling movement will therefore suffice as a description of all of them, and for purposes of convenience of description the same reference characters have been applied to the duplicated parts in each of the roller units.

Upon viewing Figs. 1 and 2 of the drawings, it will be observed that the rollers 13 are each carried in a frame 22 for universal movement with reference thereto, by means of the self-aligning bearing 27 carried by the pin 28 supported from the frame 22.

The frames 22 in turn are each mounted for pivotal movement about an axis diametric of the roller and perpendicular to the axis through the points of adhesive contact of each roller with the races by means of pins 25 about which the frames 22 swivel and the pins 25 in turn are mounted in ears 26 fixedly related to and carried by the cage 20.

From the description thus far given, it will be understood that the roller frames 22 are capable of a tilting movement about the axis through the pins 25 and that the rollers 13 are capable of universal movement with reference to the frames.

I will now describe my arrangement whereby any tilting of a frame about its axis through the pins 25, will cause an angling of its roller about an axis through the points of adhesive contact of such roller with the races, and how any angling of a roller will, in turn, cause its frame to tilt. Each roller frame 22 carries at one side of the roller a pin 31 which lies in a plane perpendicular to the axis 28 of the roller. Toward each of its ends, the said pin 31 carries pivotally mounted a shoe 30. Such a pin as described with pivoting shoes on its ends may be provided on both sides of the roller as shown in Fig. 2 although it will be understood that only one of such systems may be used.

An inspection of Fig. 1 will show that the shoes 30 are provided with projections 33 which extend toward the roller into close proximity to the adjacent surface thereof. I wish it to be understood that these protruding parts or fingers 33 shall clear this adjacent surface sufficiently to permit the roller to rotate free of the fingers, but, however, just sufficiently to bring the fingers in contact with the side of the roller if the roller makes a slight tilting movement with respect to the frame 22, and to reduce to a minimum the friction of this contact between control shoes and the surface of the roller, I provide the roller surface 82 on each side of the roller with an annular shoulder 81 and of such width and so placed that the contact of the fingers 33 with the roller will take place only with the smoothly ground surface 83 of the shoulder 81.

The pin 31 serves a double purpose: One, as a pivot for two shoes 30 positioned to one side of the roller, and the other to securely hold in place the axis 28 which supports the roller within the frame 22, thus avoiding the necessity of a separate means to hold the axis 28 in place.

I will now describe my construction for the interconnection of the roller frames 22 so as to assure their simultaneous movement, whereby the tilting of one of the frames will cause all the other frames to tilt simultaneously therewith and in the same direction and to the same extent. Inspection of Figs. 1 and 2 shows that I provide the hub of the spider 20 with an extension 21 and a sleeve 40 mounted for sliding movement upon this extension. This sleeve is very short, its length being about equal or even less than its inner diameter, so that its travel upon the extension is about equal to its own length. It is provided with as many pairs of ears 44 as there are rollers in the transmission. In the drawings I have shown an arrangement with three rollers. Each pair of ears forms a slot between themselves and are so arranged that the inner surfaces are parallel to each other, and so that the inner surfaces of all of the ears at one side lie in a plane perpendicular to the geometrical axis of the sleeve. It is evident from this description that the inner surfaces of the slots can be manufactured by a grinding operation at very little cost with any desired accuracy with respect to its perpendicularity to the geometrical axis of the sleeve.

Each of the roller frames 22 is provided on its inner part with a pair of ears 42 as may be seen from inspection of Fig. 1. Carried by these last named ears 42 is a pin 41 positioned parallel to the tilting axis of the roller frame 22. A feature of my invention is that the distance of these pins 41 from the tilting axis 25—25 of the roller frames 22 is identical for all rollers of a system and furthermore, that their position with respect to the plane containing the tilting axis 25—25 and the roller axis 28 (respectively the geometrical axis of these material axes) will be the same for all roller frames so that if the pin 41 of one roller frame is offset to the right of said plane to a certain extent, the pins 41 of the other frames of the same set will be offset in the same direction and to the same extent. I want to point out that the absolute value of the two dimensions is not important as long as the figures are the same for all of the rollers of one set.

The diameter of the pins 41 is such that they fit snugly in the slot between the ears 44. An inspection of Fig. 2 will show that for the position of the roller shown, the pin will make contact with the sides of the slot and that a tilting movement of the carrier 22 will cause a longitudinal sliding movement of the sleeve 40, whereby, during such movement, the pin 41 will slide radially inward or outward in the slot.

It has been found that slight deviations in the true parallelism between the pin 41 and the tilting axis 25 will cause a jamming or clamping of the pin 41 between the ears 44, which will depend upon the tilting angle of the roller frames 22, since it is possible that the pin lies in a plane perpendicular to the geometrical axis of the sleeve 40 for one position or one angle of tilt of the frame 22, and is inclined to such a plane for another angle of tilt of the frame 22. This jamming or clamping increases with increasing length of the contact between the pin 41 and the ears 44. I have therefore made provision whereby the length of contact between the pin and the cooperating surfaces of the ears 44 is reduced and have done so by way of example in Fig. 1 by providing each pin with a central part 41a of a somewhat larger diameter than the adjacent parts 41b. The central part 41a has a close fit between the ears 44 whereas there is considerable play between the parts 41b and the slot. This is also clearly shown in Fig. 2.

It has been found that the above construction will insure a reliable transmission of motion from one frame to all others, and that no jamming of the sleeve on its hub will occur even though the unsymmetrical forces which act upon the sleeve have a tendency to "cock" it. The described arrangement provides a truly simultaneous tilting movement of the roller frames in such a way that no lost motion or backlash can take place between the individual frames, and that an accurate equality of the tilting angles of all frames is always maintained. This construction is therefore superior to arrangements wherein gear segments on the frames mesh with a common helical gear around the transmission axis, not only as to accuracy in the position of the rolller frames, but also as to the facility and cost of manufacture.

Since it has been shown that tilting of one roller frame will cause a simultaneous movement of all the frames, it follows that such tilting could be obtained where the spider is absolutely stationary by suitable external means that will cause tilting of one frame, for instance, by having one of the tilting pins 25 fitted loosely in the boss 26 to turn therein, and securing it to frame 22 by a key or otherwise, so as to enforce their simultaneous rotation and providing it with an extension to the outside of the transmission housing operable by means such as a lever or hand wheel.

I will now describe my arrangement whereby such external control can be effected in a system in which the spider is mounted for a limited rotational movement around the main axis of the transmission to develop a reaction torque to operate the torque loading system as disclosed in my application, Serial No. 696,455, or to take up or delay the transmission of torsional shocks which may enter from either end along the shafts.

This arrangement comprises an extension 51 which protrudes radially toward the outside from that frame which is to be tilted and provided at its extreme end with a ball-shaped roller 52 positioned beyond the circumference or rim of the spider 20 sufficiently to engage with a member 54 which slides parallel to the main axis of the transmission and also outside of the rim of the spider 20. The sliding member 54 is provided with a slot 53 of such width that the ball 52 fits in it with just enough play to permit it to roll on one side of the slot without rubbing against the other side and yet without showing any appreciable backlash between the two side walls of the slot. The member 54 is guided in its axial sliding movement by two bars 55. The lengthwise movement of the member 54 is controlled from the outside by means of a rack 56 secured to it by screws or otherwise, and a pinion 57 in mesh with rack 56 and secured to shaft 58 which extends toward the outside of the transmission.

It is now obvious that rotation of shaft 58 will, in turn, causes a sliding lengthwise movement of the member 54 and thereby also a movement of the ball 52 to cause the tilting of a selected frame around its pinions 25—25.

From an inspection of Fig. 1 it will become apparent that the tilting movement of the ball 52 will be perpendicular to the direction of the slot 53 so that no interference is possible of one movement with the other, no matter what the relative position of the ball 52 with respect to the slot 53 may be, and no matter what the actual angling or tilting of the respective roller frame may be.

An inspection of Fig. 2 further shows that the sliding member 54 moves in a direction opposite to that of sleeve 44 which interconnects part of the roller frames. This is effected by what in effect is a lever formed by the frame of roller 22 including the shaft of roller 28, and also roller 13ᴮ itself. The roller serves as a fulcrum for the lever and the force acting on this fulcrum is transmitted from the roller frame to the races, since the frames are not held or fixed axially in any way to the housing but are free to float and find their position between the two races.

It follows therefore that in the mechanism as described, the rollers themselves are used as a fulcrum for transmitting the control or shifting motion from the outside to the inside and that one of the rollers which is fitted with the shifting ball 52 therefore serves a double purpose. This arrangement constitutes a simplification over other arrangements since it does away with additional auxiliary fulcrums and levers for controlling the transmission ratio from the outside of the roller assembly on the spider.

I will now describe my arrangement whereby a roller can be tilted without directly tilting its frame, to thereby reduce the resistance to such control movement and the force necessary to effect a change in the ratio transmission.

Upon viewing Fig. 1 of the drawings, it will be observed that the roller having the reference character 13ᴮ applied thereto is provided with a yoke 50 which partly surrounds its frame 22, and can be tilted around the same axis as the frame 22, by means of the arms 60 which are journalled upon the pinions 25. The yoke 50 is provided with two sets of laterally and opposedly directed projections 62 (Fig. 3) and each projection is provided with a finger 64 directed inwardly toward the roller 13ᴮ. Two of these fingers can be seen in Fig. 1 and all four of them are shown in Fig. 3.

Mounted about the axis of the roller 13ᴮ is an annulus 65 (see Fig. 3) provided with the oppositely and outwardly extending wings or fingers 66, the free end of each wing or finger 66 being provided with a riser or bump 67, as shown more clearly in Figs. 1 and 2.

It will be stated here that the element 65, 66 is made of spring metal and is in floating contact with the roller, and is so constructed, related and biased with reference to the roller 13B as normally to be frictionally engaged by the roller sufficient to cause the roller to carry the member 65, 66 along with it in its rotation as long as this member is free to partake in such rotation. Such element 65, 66 is carried around with the roller 13B in one direction until one of the arms 66 will abut against one of the shoes 30 at one end and the other arm 66 will abut the other shoe 30 at the other end, so that the arms will take the position shown in Fig. 3 of the drawings, assuming the rotation of the roller to be counter-clockwise as indicated by the arrow in Fig. 3, and in this relationship the member 65, 66 will remain in the position shown in Fig. 3 as long as the roller 13B continues rotating in the same direction.

If the direction of movement of the roller should be reversed, then the member 65, 66 will be given a clockwise movement from its position shown in Fig. 3 to a reverse position, but which is symmetrical with respect to a vertical line through the center of the roller shown in Fig. 3. Therefore, the arms 66 will occupy either the position shown in Fig. 3 or a position where these arms are in abutting relation to the two other diametrically opposed ends of the shoes 30.

In whichever of these two angular positions the arms or wings 66 may be, it will be observed, from Figs. 2 and 3 that the bumps or raised portions 67 at the ends thereof will be inwardly placed between the fingers 64 of the yoke 50 and the side surface of the roller within that annular area designated by 83. The bumps 67 are of such thickness that a very small clearance remains between their outer surface and the approximate surface of the finger 64, so that upon a slight angling of the yoke 50, about its pivotal axis 25—25, in one or the other direction, one of the fingers 64 will be approaching the side surface of the roller and will immediately transmit its movement to the bump 67 between it and the roller, and thereby apply a pressure to the roller at this point. By way of example, if the yoke 50 in Fig. 2 is tilted counterclockwise, which corresponds to a movement of the yoke 50 toward the left side in Fig. 3, the finger 64 which is in the left upper quadrant in Fig. 3 will be moved inwardly toward the roller if the roller rotates in the direction of the arrow, that is counterclockwise. If the yoke 50 would be moved in the opposite direction, that finger 64 which is found in the right lower quadrant of Fig. 3 would be moving toward the roller and apply a pressure to the side of the roller at that point. If the direction of rotation of the roller is changed, the element 65, 66 would also change its position whereby the two fingers just referred to would become inoperative while the bumps 67 would be placed under the respective fingers in the right upper and left lower quadrants. The application of pressure to the side of the roller, for instance, in Fig. 3 in the left upper quadrant will cause an inclination of the roller around an axis going through the contact points with the races (14—14 in Fig. 2) and more particularly, it would cause the upper part of the roller (Fig. 3) to move backward and the lower part to move forward with respect to the plane of the paper. Since the race 11 on the left side of the roller 13B is moving clockwise as seen from the left side of Fig. 2, and the inclination just mentioned of the roller corresponds to a counterclockwise movement of the roller around the axis 14—14 (also seen from the left side in Fig. 2), it follows that the roller will run on a spiral path approaching the center of the race 11 on the one side and approaching the periphery of the race 11' on the other side. This spiral movement causes a tilting of the roller around the axis 25—25, which will show as a counterclockwise turning of the roller in Fig. 2. Upon the presumption that the yoke 50 had been tilted toward the left or counterclockwise in Fig. 2, we see that the roller has followed the tilting movement of the yoke 50. The roller 13B cannot, however, make this tilting movement without taking along its frame 22 because the surface part 83 of the roller will touch the shoes 30 and thereby force the frame 22 to follow the movement of the roller.

We find as a final result that any movement of the yoke 50 will be followed by the roller and by the frame 22. It can further be seen that during such tilting movement of the roller with respect to the yoke 50, the roller assumes its original relative position with respect to that yoke. In other words, as the roller starts tilting and thereby turning counterclockwise, it relieves the pressure upon the left upper bump 67 (Fig. 3) of the roller and thereby reduces the inclination of the roller around the axis 14—14 until finally with the yoke 50 and its fingers held stationary while the side of the roller and the bump 67 are moving away from it, the contact between the bump 67 and the finger 64 will cease altogether. At this moment, there is no external force causing an inclination of the roller and therefore the inclination becomes zero; there being no more inclination of the roller, the roller stops travelling in a spiral and therefore also stops its tilting movement around its axis 25—25 and continues to run in a circular path as before the tilting of the yoke 50 began.

It will be further observed that such tilting of the frame 22 will, because of the inter-connection between all the roller frames, which has been described in detail previously, cause a simultaneous tilting of all of the other roller frames, and thereby also a corresponding tilting movement of the other rollers. This is what is commonly termed a "master and follow roller control system"; the roller 13B above described is the master roller and the two others are follow rollers.

Having thus described my invention, and illustrated its use, what I claim as new and desire to secure by Letters Patent is—

1. In a power transmission system having a pair of coaxial, toric races, one of which is the driving member, and the other the driven member, and a system of rolling bodies between said races and in adhesive contact therewith, whereby power is transmitted between said races; a mounting for each of said rollers comprising a pivoted frame adapted to tilt about an axis perpendicular to the line passing through the contact points between the roller and the races and lying in the plane of rotation of the roller for varying the speed ratio of the transmission, and means for mounting said roller within said frame for rotation therein and for angling about an axis angularly related to the axis of tilting, a pair of elements pivotally carried by each of said frames, said elements being positioned on opposite sides of the axis of rotation of the roller, each element comprising, at each side of its pivot point, a contact portion adapted to engage the roller, whereby said elements will be adapted, by contacting with the surface of the roller, to maintain the roller in a central position in relation to the frame.

2. In a power transmission system having a pair of coaxial, toric races, one of which is the driving member, and the other the driven member, and a system of rolling bodies between said races and in adhesive contact therewith, whereby power is transmitted between said races; a mounting for each of said rollers comprising a pivoted frame adapted to tilt about an axis perpendicular to the line passing through the contact points between the roller and the races and lying in the plane of rotation of the roller, for varying the speed ratio of the transmission, and means for mounting said roller within said frame for rotation therein and for angling about an axis angularly related to the axis of tilting, a pair of elements pivotally carried by each of said frames on each side of said roller, one element of each pair being positioned on an opposite side of the axis of rotation of the roller from the other element of said pair, each element comprising at each side of its pivot point, a contact portion adapted to engage the roller, whereby said elements will be adapted, by contacting with the surface of the roller, to maintain the roller in a central position in relation to the frame.

3. In a power transmission system having a pair of coaxial, toric races, one of which is the driving member, and the other the driven member, and a system of rolling bodies between said races and in adhesive contact therewith whereby power is transmitted between said races; a roller mounting comprising a pivoted frame adapted to tilt about an axis perpendicular to the line passing through the contact points between the roller and the races and lying in the plane of rotation of the roller, and means for mounting said roller within said frame for rotation therein and for angling about an axis angularly related to the axis of tilting, a pair of elements pivotally carried by said frame, said elements being positioned on opposite sides of the axis of rotation of the roller, each element comprising, at each side of its pivot point, a contact portion adapted to engage the roller, whereby said elements will be adapted by contacting with the surface of the roller to maintain the roller in a central position in relation to the frame, a member mounted coaxially with the roller and adapted to be rotated thereby, stop means to limit the rotation of said member, contact points on said member adapted to engage the side of the roller for the purpose of angling the same, said contact points being normally in engagement with the roller and having their positions determined by the rotation of said member, and control means to selectively operate one of said contact points to effect angling of the roller.

4. In a power transmission system having a pair of coaxial, toric races, one of which is the driving member, and the other the driven member, and a system of rolling bodies between said races and in adhesive contact therewith whereby power is transmitted between said races; a roller mounting comprising a pivoted frame adapted to tilt about an axis perpendicular to the line passing through the contact points between the roller and the races and lying in the plane of rotation of the roller, and means for mounting said roller within said frame for rotation therein and for angling about an axis angularly related to the axis of tilting, a pair of elements pivotally carried by said frame, said elements being positioned on opposite sides of the axis of rotation of the roller, each element comprising, at each side of its pivot point, a contact portion adapted to engage the roller, whereby said elements will be adapted by contacting with the surface of the roller to maintain the roller in a central position in relation to the frame, a member mounted coaxially with the roller and adapted to be rotated thereby, stop means to limit the rotation of said member, contact points on said member adapted to engage the side of the roller for the purpose of angling the same, said contact points being normally in engagement with the roller and having their positions determined by the rotation of said member, and control means to selectively effect engagement of one of said contact points with the roller, said stop means being constituted by said elements.

5. For use in a variable speed power transmission having rollers in adhesive contact with a pair of opposed toric races, means for mounting a roller for tilting about an axis lying in the plane of rotation of the roller for purposes of speed variation, and for angling whereby during such angling its axis of rotation will pass aside of the race axis in order to effect the said tilting movement, a construction for effecting the said angling of a roller, comprising a member adapted to pivot about the axis of rotation of the roller and carrying resilient extending arms at each end thereof, each of said arms being provided with a contact point positioned at the end thereof and symmetrically in relation to the roller and adapted to engage the surface of the roller, said member carrying the contact points being free to pivot about the roller axis and to follow the roller in its rotation in either direction through a limited range, stops to limit said range, and control means adapted to pivot about the tilting axis of the roller for selectively engaging one of said arms to press the adjacent contact point against the surface of the roller so as to angle the same.

6. A roller assembly for an adhesive transmission comprising races and rolling bodies including a tiltable frame, a spherical bearing for the roller and a shaft carrying said spherical bearing within the frame, a pin lying in a plane parallel to the plane of the roller and carrying one pivoting shoe on each end, the pin transecting the shaft of the roller and fixing its position with respect to the frame.

7. In a power transmission having coaxial toric races and rollers contacting therewith, a mounting for each roller comprising a tiltable carrier and means for journalling said roller for free rotation upon said carrier and for angling the roller about an axis angularly related to the axis of tilting, a pair of elements positioned laterally of said roller and capable of contacting its side surface at parts thereof which are diametrically opposite of each other with respect to the axis of rotation of the roller, and means for pivotally supporting each of said elements respectively about an axis which lies laterally of the plane of rotation of the rollers and is substantially perpendicular to the axis of rotation of the roller; a member mounted coaxially with the roller and extending diametrically to both sides of the axis of rotation of the roller, means for supporting said member for free rotation within a predetermined limited arc, elastic means for holding the end portions of said member in contact with said roller, and means for selectively pressing the end portions against the roller for the purpose of angling the same.

8. In a power transmission system having coaxial toric races and rollers contacting therewith, a mounting for each roller comprising a tiltable frame and means for journalling said roller for free rotation and for angling about an axis angularly related to the axis of tilting, a pair of elements pivotally carried by said frame, a pivot for each of said elements positioned laterally of the side surface of the roller and having its (the pivot's) center within a plane containing the axis of rotation of the roller and the points of contact between roller and races, each of said elements having a portion adapted for contacting the side surface of the roller in a contact area extending to both sides of the aforementioned plane to maintain the roller in a central position in relation to the frame, a member mounted coaxially with the roller and adapted to be rotated thereby, stop means to limit the rotation of said member to a predetermined arc, said member having portions adapted to contact the side surface of the roller for the purpose of angling the same, and means for pressing selectively either end of the said member against the roller surface.

9. In an adhesive transmission system comprising coaxial toric races and rollers in driving contact therewith, a tiltable carrier for each of said rollers and means for rotatably mounting each of said rollers in its carrier, means for interconnecting all of the said carriers so as to constrain them to tilt in unison, comprising a sleeve coaxial with said races and a support upon which said sleeve can freely rotate and freely slide axially, an annular groove provided on the outside of said sleeve, each of said carriers having protruding therefrom a member which is fastened to the carrier so as to tilt therewith, and each member being adapted to engage the said groove of the sleeve whereby tilting of the carrier will cause the sleeve to slide axially in proportion to such tilting of the carrier and vice versa, said sleeve being entirely free of any operative connections other than the aforementioned engagements between its groove and the said protruding carrier members, and operator operable means for causing one of the said carriers to tilt.

10. In an adhesive transmission system comprising coaxial toric races and rollers in driving contact therewith, a tiltable carrier for each of said rollers and means for rotatably mounting each of said rollers in its carrier, means for interconnecting all of the said carriers so as to constrain them to tilt in unison, comprising a sleeve positioned between and coaxial with said races and a support upon which said sleeve can freely rotate and freely slide axially, each of said carriers having protruding therefrom a member which is fastened to the carrier so as to tilt therewith, and each member being adapted to engage the said sleeve whereby tilting of the carrier will cause the sleeve to slide axially and vice versa, said sleeve being entirely free of any operative connections other than the aforementioned engagements with the said protruding carrier members, and means for tilting one of said carriers.

11. In an adhesive transmission system comprising coaxial toric races and rollers in driving contact therewith, a tiltable carrier for each of said rollers and means for rotatably mounting each of said rollers in its carrier, means for interconnecting all of the said carriers so as to constrain them to tilt in unison, comprising a sleeve positioned between and coaxial with said races and a support upon which said sleeve can freely rotate and freely slide axially, each of said carriers having protruding therefrom a member which is fastened to the carrier so as to tilt therewith, and each member being adapted to engage the said sleeve whereby tilting of the carrier will cause the sleeve to slide axially and vice versa, said sleeve being entirely free of any operative connections other than the aforementioned engagements with the said protruding carrier members and operator operable means for causing one of the said carriers to tilt.

ALAIN MADLÉ.